United States Patent [19]

Ponder

[11] Patent Number: 4,730,841

[45] Date of Patent: Mar. 15, 1988

[54] TRAILER HITCH LOCKING DEVICE

[76] Inventor: Joe L. Ponder, 123 Cheryl, Longview, Tex. 75604

[21] Appl. No.: 64,595

[22] Filed: Jun. 22, 1987

[51] Int. Cl.$^4$ .......................... B60D 1/12; B60D 1/06
[52] U.S. Cl. ...................................... 280/507; 70/258
[58] Field of Search .................. 280/507, 506, 511; 70/58, 254

[56] References Cited

U.S. PATENT DOCUMENTS

| 3,884,055 | 5/1975 | Vuillemot | 280/507 |
| 4,141,569 | 2/1979 | Dilk | 280/507 |
| 4,577,884 | 3/1986 | Harris | 280/507 |

Primary Examiner—John J. Love
Assistant Examiner—Donn McGiehan
Attorney, Agent, or Firm—Ronald B. Sefrna

[57] ABSTRACT

A device for preventing theft of a towed trailer vehicle having a socket-like hitch coupler mounted on an elongate trailer tongue member. The device includes an elongate base plate, a post mounted on the base plate to be received in the socket of the hitch coupler, a second elongate plate hingeably interconnected to said base plate to be positioned over the hitch coupler, a locking bar to secure the second plate in place over the hitch coupler, and a lock enclosure to protect a locking means against tampering when the device is in place upon the trailer vehicle hitch coupler.

9 Claims, 4 Drawing Figures

TRAILER HITCH LOCKING DEVICE

FIELD OF THE INVENTION

This invention relates generally to locking devices for trailer vehicle hitch couplers, and relates more specifically to a device for locking a socket-type trailer vehicle hitch coupler by closing the hitch coupler socket against insertion of a trailer hitch ball for towing of the trailer vehicle.

BACKGROUND OF THE INVENTION

It has become standard practice in the trailer and trailer hitch industry to employ trailer hitch coupler designs of more or less standardized design, such that the trailer vehicle hitch coupler is readily attachable to trailer hitch balls mounted on a wide variety of towing vehicles. While this standardization has the advantage of allowing easy interchangeability of tow vehicles, it also has the corollary disadvantage of facilitating theft of unattached and unattended trailer vehicles. The advances of recent years in trailer hitch coupler designs which have made the coupling of trailer vehicles to tow vehicles a simple process have also made it possible for an unauthorized person to remove an unprotected trailer vehicle in a very short time.

A number of attempts have been made to provide devices intended to prevent trailer vehicles theft by locking the hitch coupler against attachment of a tow vehicle. Some of these attempts, as exemplified by U.S. Pat. Nos. 2,571,349 and 3,884,055, have provided relatively simple devices with externally disposed and unprotected locking means. Such devices, while easy to use, have the disadvantages of relatively loose fit and of failure to protect the locking means against tampering or removal with bolt cutters. Other approaches, as exemplified by U.S. Pat. Nos. 4,141,569 and 4,538,827, afford more locking means protection but suffer the disadvantages of reduced adaptability to different coupler designs and of higher cost associated with their more complex nature.

SUMMARY OF THE INVENTION

The device of the present invention generally comprises an elongate base plate of shallow U-shaped configuration having a cylindrical post disposed thereon intermediate two ends, an elongate closure plate, of similar shallow U-shaped configuration hingeably interconnected at one end to one end of said base plate and having an elongate locking plate disposed at its opposite end, a locking rod of modified U-shape, and a hollow cylindrical locking means enclosure. The elongate closure plate preferably includes a reinforcing member attached to its upper face, and further includes a removeable shim attached to its inner face opposite the reinforcing member so that the device may be readily adapted for use with almost any trailer vehicle coupler design and configuration.

The base plate and the closure plate are of substantially equal over all length and are hingeably interconnected in mirrored relationship such that the ends of the plates opposite such interconnection are brought into abutting relationship upon closure of the device and a space or slot is defined between the longer faces of said plates. The cylindrical post is centered upon the inner face of the base of said base plate and firmly interconnected thereto with its longitudinal axis perpendicular thereto, such that said post extends from said base plate toward the longer face of said closure plate.

The locking means enclosure comprises a hollow open-ended cylindrical body and is firmly attached to the outer face of the leg of said U-shaped base plate opposite its interconnection to said base plate. The locking means enclosure is disposed with its longitudinal axis perpendicular to the plane of the bottom face of said base plate and with its lower edge above said plane. Said enclosure is not laterally centered upon the outer face of the base plate leg to which it is interconnected but is offset to allow a locking plate interconnected to the outer face of the closure plate to be brought into tangent relation to the outer surface of said cylindrical enclosure upon closing of the device. Said enclosure includes an aperture penetrating its cylindrical wall, disposed at the longitudinal midpoint of said enclosure with the axis of said aperture perpendicular to the longitudinal axis of said base plate.

The longer face of said closure plate is partially cut away to eliminate interference with any portions of the trailer hitch couplers with which the device is designed to be used. The remaining portion of said face includes a reinforcing member interconnected thereto to alleviate any loss of rigidity resulting from removal of a portion of said plate. The face of said closure plate opposite the reinforcing member includes a removeable shim so that the device may be securely fitted to a trailer vehicle coupler. Said closure plate further includes a locking plate interconnected to the outer face of the leg opposite the hinged interconnection between closure plate and base plate. Said locking plate is perpendicular to both the outer face of said leg and the plane of the longer face of said closure plate, and is disposed on the face of said leg so that, upon closing of the device, said locking plate is brought into proximity with the outer surface of said locking means enclosure, overlapping the aperture in said enclosure. The locking plate includes an aperture which is coaxially aligned with the aperture penetrating said enclosure when the device is closed.

In use, the device is positioned with the post inserted into the socket of a trailer hitch coupler and the cutaway portion of the closure plate nearer the trailer body, the closure plate is rotated about its hinged interconnection to the base plate so that the closure plate lies above the coupler and the locking plate aperture is aligned with the locking means enclosure aperture. The short leg of the locking rod is inserted through said apertures into the interior of said enclosure, and is secured in place with a standard padlock which is thus protected from tampering by the wall of said enclosure.

These and other features and advantages of the device of the invention will be disclosed in more detail with reference to the accompanying drawing figures.

Figure 1:
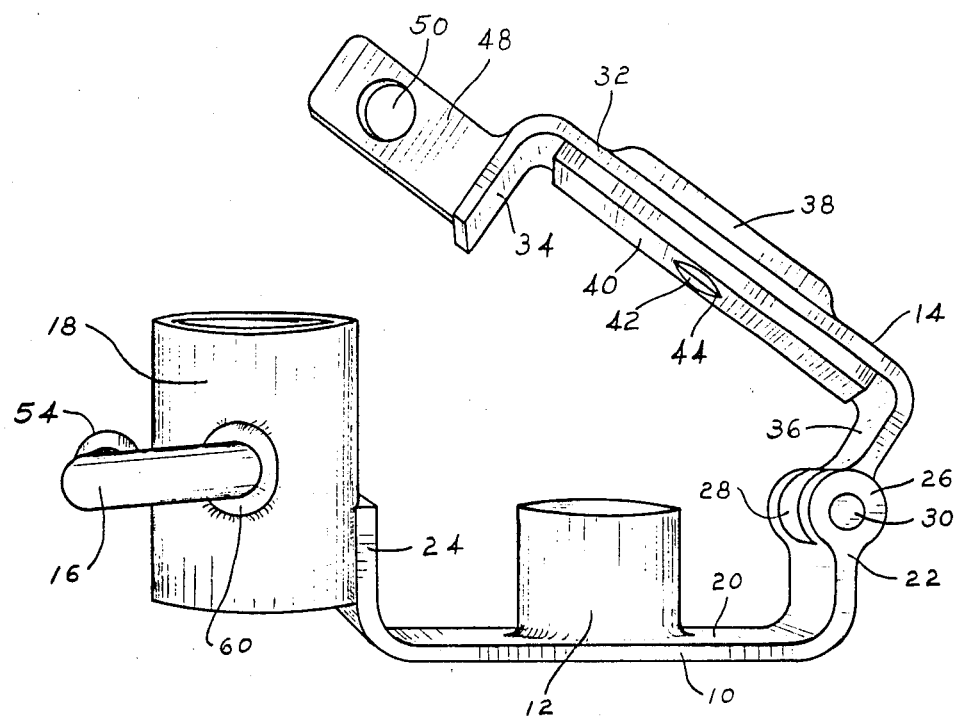
FIG. 1 is a perspective view of the device of the invention.
Figure 2:
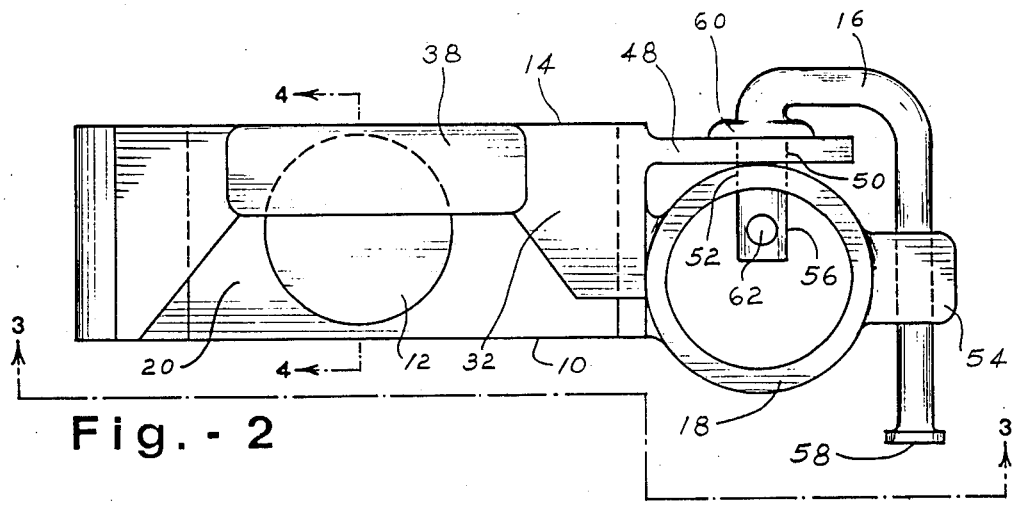
FIG. 2 is a plan view of the device of the invention in a closed position.
Figure 3:
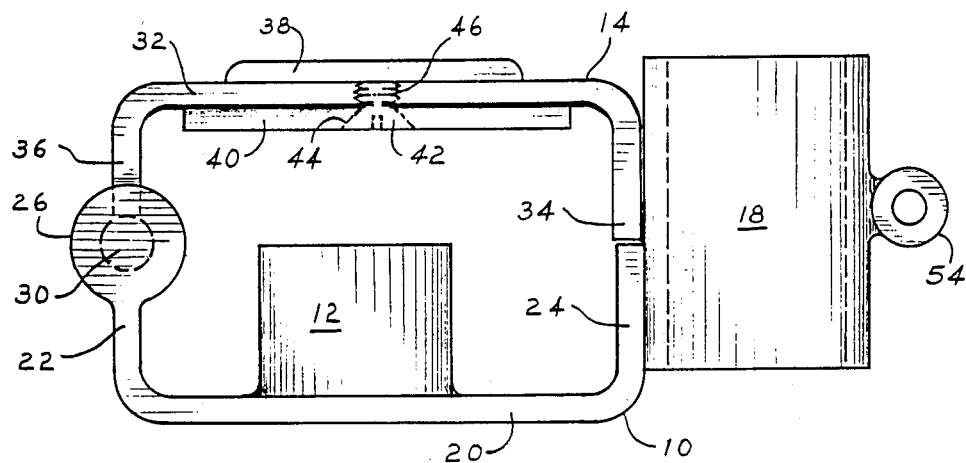
FIG. 3 is an elevation view of the device of the invention along line 3—3 of FIG. 2.

With reference to FIG. 1, FIG. 2, and FIG. 3, it will be seen that the trailer hitch coupling device of the present invention generally comprises base plate 10, post 12, closure plate 14, locking rod 16, and locking means enclosure 18. Base plate 10 is configured in a shallow U-shape with an elongate central portion 20 of sufficient length to extend across the width of a trailer hitch coupler, curved through 90 degrees at each end to form legs 22 and 24, respectively. Post 12, centrally disposed on and firmly interconnected to central portion 20, comprises a preferably hollow cylinder closed at its upper end, with a cross-sectional diameter and height selected to allow post 12 to be received in and substantially fill the socket of a trailer hitch coupler. Leg 22 of base plate 10 is firmly interconnected to hinge sleeve 26, which is aligned with hinge sleeve 28 to receive hinge pin 30 in order to provide a hinged interconnection between base plate 10 and closure plate 14.

Closure plate 14 comprises a shallow U-shaped plate having an elongate central portion 32, the ends of which are curved through 90 degrees relative to the central portion to form legs 34 and 36. Leg 36 is interconnected to hinge sleeve 28 and hingeably interconnected to base plate 10 as previously described. The central portion 32 of closure plate 14 is cut away as depicted in the drawing figures in order to avoid interference with vertical projections present on trailer hitch couplers and facilitate installation of the device on such couplers. The central portion 32 of closure plate 14 is preferably stiffened by provision of reinforcing plate 38, disposed and longitudinally centered on the upper surface of central portion 32. Reinforcing plate 38 is rigidly attached to central portion 32 by welding or other conventional means. Closure plate 14 further preferably includes shim 40, a generally rectangular thin plate disposed on the lower surface of central portion 32 opposite reinforcing plate 38. Shim 40 is removeably interconnected to central portion 32, preferably by means of screw 42 inserted through an aperture 44 in shim 40 and into threaded aperture 46 in central portion 32 of closure plate 14, in order to allow a user of the device to obtain a close and secure fit between the device and a particular trailer hitch coupler.

The primary locking components of the device comprise locking plate 48, locking rod 16, and locking means enclosure 18. Locking plate 48, an elongate generally rectangular plate of greater width than thickness, is disposed on the outer surface of leg 36 of closure plate 14, with its longitudinal axis perpendicular to said outer surface and with its rectangular faces perpendicular to the plane of central portion 32 of closure plate 14. Locking plate 48 is rigidly interconnected to leg 36, preferably by welding. Locking plate 48 is penetrated by aperture 50 intermediate its two ends.

Locking means enclosure 18 comprises a hollow cylindrical body open at both ends, rigidly interconnected to leg 24 of base plate 10 by welding or other conventional means. Locking means enclosure 18 is disposed with its longitudinal axis perpendicular to the plane of base plate 10, positioned such that locking plate 48 is brought into tangent contact with the outer surface of locking means enclosure 18 upon closing of closure plate 14. Locking means enclosure 18 includes aperture 52 intermediate its ends positioned to be coaxially aligned with aperture 50 in locking plate 48 when closure plate 14 is in a fully closed position. Locking means enclosure 18 further includes a hollow open-ended cylindrical rod guide 54, disposed on the outer surface of locking means enclosure 18 and rigidly interconnected thereto. The longitudinal axis of rod guide 54 is parallel to the axis of aperture 52 and the plane including both axes is preferably parallel to the plane of base plate 10.

Locking rod 16 comprises an elongate preferably cylindrical rod formed into a U-shape with one extended leg and one short leg 56 which will be received through apertures 50 and 52 to secure closure plate 14 in a closed position. The extended leg of locking rod 16 is slideably disposed through the hollow interior of rod guide 54, and locking rod 16 is configured such that the leg 56 may be coaxially aligned with apertures 50 and 52 and inserted therethrough. Locking rod 16 preferably includes flange 58 interconnected to the end of the extended leg of said rod guide to prevent removal of locking rod 16 from rod guide 54, and flange 60 disposed at the base of leg 56 to arrest its insertion through apertures 50 and 52. Leg 56 includes aperture 62 disposed near its end, with the axis of aperture 62 parallel to the longitudinal axis of locking means enclosure 18 when said leg 56 is inserted through apertures 50 and 52.

Figure 4:
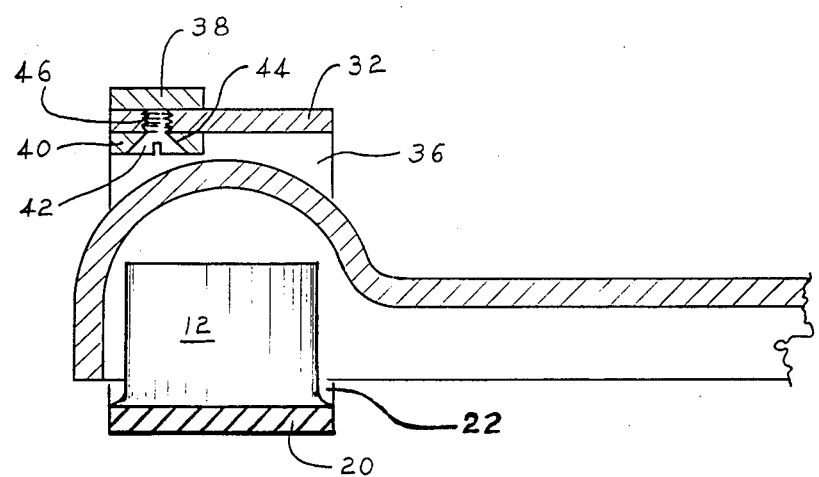
FIG. 4 is a cross-sectional view of the device of the invention relative to a typical trailer hitch coupler, along line 4—4 of FIG. 2.

With reference now to FIG. 4, the device of the invention is used by rotating closure plate 14 about its hinged interconnection with base plate 10 to an open position, inserting post 12 into the socket of the trailer hitch coupler to the position depicted in FIG. 4, and rotating closure plate 14 in the opposite direction about said hinged interconnection to a closed position with aperture 50 in locking plate 48 aligned with aperture 52 in locking means enclosure 18. Shim 40 may be used or omitted as appropriate for the trailer hitch coupler to be secured, in order to acheive a tight fit of base plate 10 and closure plate 14 about the coupler without preventing alignment of apertures 50 and 52. Leg 56 of locking rod 16 is then inserted through apertures 50 and 52 and a padlock is placed in the interior of locking means enclosure 18 and locked with its shaft through aperture 62, thus preventing removal of leg 56 from apertures 50 and 52 and subsequent opening of closure plate 14. The padlock may be readily opened by insertion of its key from the open end of locking means enclosure 18, but is protected against cutting or tampering to a significant degree.

Although the preferred embodiment of the present invention has been disclosed and described in detail, such description is by way of illustration and not limitation, and described in detail, it will be understood that modifications and alternatives may be employed without departing from the scope and spirit of the invention.

What is claimed is:

1. A theft prevention device to lockably obstruct the socket of a trailer hitch coupler, comprising
   an elongate base plate of shallow U-shaped configuration;
   a post interconnected to said base plate intermediate its two ends;
   an elongate closure plate of shallow U-shaped configuration hingeably interconnected at one end to one end of said base plate in opposing relationship thereto;
   an elongate locking plate interconnected at one end to said closure plate near its end opposite its hingeable interconnection to said base plate, said locking plate being penetrated by an aperture intermediate its two ends;
   a hollow open-ended locking means enclosure having a continuous side wall, interconnected to said base plate near its end opposite its hingeable interconnection to said closure plate, said wall of said locking means enclosure being penetrated by an aperture coaxially alignable with the aperture penetrating said locking plate; and a locking rod, one end of which is adapted to be inserted through the aperture in said locking plate and through the aperture in the wall of said locking means enclosure into the interior of said locking means enclosure, said end of said locking rod being penetrated by an aperture adapted to receive the shaft of a padlock or other suitable locking means.

2. The device of claim 1, wherein
said elongate base plate includes an intermediate face and two short legs forming said shallow U-shaped configuration;
said elongate closure plate includes an intermediate face and two short legs forming said shallow U-shaped configuration;
said hingeable interconnection between said base plate and said closure plate is made between the end of a first said shorter leg of said base plate and the end of a first said shorter leg of said closure plate;
the end of the second said shorter leg of said base plate and the end of the second said shorter leg of said closure plate are in abutting relation when said intermediate face of said base plate and said intermediate face of said closure plate are brought into opposing parallel relationship by rotation of said plates about said hinged interconnection.

3. The device of claim 1, wherein said post is configured to be fully received in the socket of a trailer hitch coupler.

4. A theft prevention device to lockably obstruct the socket of a trailer hitch coupler, comprising
an elongate base plate of shallow U-shaped configuration to underlie a trailer hitch coupler and obstruct the opening into the socket of said coupler, said base plate having an intermediate face and two parallel legs disposed above and perpendicular to the plane of said intermediate face;
a post to be substantially received within said obstruct said socket of said coupler, interconnected to said intermediate face of said base plate with its longitudinal axis perpendicular to the plane of said intermediate face and disposed above said plane;
an elongate closure plate of shallow U-shaped configuration to overlie said coupler, said closure plate having an intermediate face equal in length to the intermediate face of said base plate and two parallel legs disposed below the plane of said intermediate face; the end of a first of said legs of said closure plate being hingeably interconnected to the end of a first of said legs of said base plate;
an elongate locking plate interconnected at one end to the outer face of the second leg of said closure plate, with the plane of said locking plate perpendicular to both the plane of said second leg and the plane of the intermediate face of said closure plate, the face of said locking plate being penetrated by an aperture intermediate its two ends;
a hollow open-ended locking means enclosure having a continuous side wall, interconnected to the outer face of said second leg of said base plate with the longitudinal axis of said locking means enclosure perpendicular to the plane of the intermediate face of said base plate, and disposed on said outer face of said second leg such that the plane of the intermediate face of said locking plate is tangent to the outer surface of the side wall of said locking means enclosure; said side wall being penetrated by an aperture coaxially aligned with the aperture penetrating said locking plate when said closure plate is rotated to bring its intermediate face into opposed parallel relation to the intermediate face of said base plate;
a locking rod to be inserted through the aperture in said locking plate and through the aperture in said locking means enclosure to secure the theft prevention device in a closed position about the trailer hitch coupler, said locking rod being penetrated by an aperture near its end which is to be inserted through said apertures.

5. The device of claim 4, wherein said closure plate further includes a wide notch in its intermediate face to provide clearance for a hitch coupler mechanism mounted at the top of said trailer hitch coupler 6. The device of claim 4, wherein said closure plate further includes a reinforcing plate rigidly interconnected to the upper surface of its intermediate face, and a shim plate removeably interconnected to the lower surface of said intermediate face.

7. A theft prevention device to lockably obstruct the socket of a trailer hitch coupler, comprising
an elongate base plate of shallow U-shaped configuration to underlie a trailer hitch coupler and obstruct the opening into the socket of said coupler, said base plate having an intermediate face and two parallel legs integrally interconnected thereto and disposed above and perpendicular to the plane of said intermediate face;
a cylindrical post to be received within and obstruct said socket of said coupler, disposed above the plane of said intermediate face of said base plate with its axis perpendicular to said plane, longitudinally centered upon said intermediate face and rigidly interconnected thereto;
an elongate closure plate of shallow U-shaped configuration to overlie said coupler and secure the device thereon, having an intermediate face equal in length to the intermediate face of said base plate, said intermediate face of said closure plate having a wide notch from its edge to be disposed toward the rear of said trailer hitch coupler, said closure plate further having two parallel legs integrally interconnected to its intermediate face and disposed perpendicular to and below the plane of said intermediate face, the end of a first of said legs of said closure plate being hingeably interconnected to the end of a first of said legs of said base plate;
a reinforcing plate longitudinally centered upon the upper surface of the intermediate face of said closure plate, aligned along one edge with the edge of said intermediate face opposite said notch therein, and rigidly interconnected thereto;
a shim plate longitudinally centered upon the lower surface of the intermediate face of said closure plate, aligned along one edge with the edge of said intermediate face opposite said notch therein, and removeably interconnected thereto;
an elongate locking plate interconnected at one end to the outer face of the second leg of said closure plate, with the plane of said locking plate perpendicular to both the plane of said second leg and the plane of the intermediate face of said closure plate, the face of said locking plate being penetrated by an aperture intermediate its two ends;
a hollow open-ended cylindrical locking means enclosure having a continuous annular wall, said locking means enclosure interconnected to the outer face of the second leg of said base plate with the longitudinal axis of said locking means enclosure perpendicular to the plane of the intermediate face of said base plate, disposed on the outer face of said second leg such that the outer surface of the annular wall of said locking means enclosure is in tangent relation to the nearer surface of said locking plate when the closure plate is rotated to a closed position, said annular wall being penetrated by an aperture coaxially aligned with the aperture in said locking plate with the device in a closed position;

a locking rod of U-shaped configuration having one longer leg and one shorter leg, said locking rod being slideably interconnected to said locking means enclosure by a hollow open-ended rod retainer interconnected to said locking means enclosure with its longitudinal axis parallel to the axis of the aperture penetrating the annular wall of said locking means enclosure, the longer leg of said locking rod being retained therein and the shorter leg of said locking rod being coaxially alignable with the aperture in said locking plate and with the aperture in said annular wall of said locking means enclosure to be inserted there-through, said shorter leg being penetrated by an aperture near its end to receive a locking means.

8. The device of claim 7 wherein said locking rod includes a shoulder at the end of its longer leg to prevent withdrawal of said locking rod from said rod retainer, and further includes a shoulder disposed on its shorter leg to arrest insertion of said shorter leg into the interior of said locking means enclosure.

9. The device of claim 7, further comprising removeable caps to be positioned upon the open ends of said lock retaining means to prevent entry of rain water and other contaminants into the interior of said locking means enclosure.

* * * * *